(12) United States Patent
Sakura et al.

(10) Patent No.: US 8,317,645 B2
(45) Date of Patent: Nov. 27, 2012

(54) SILENT CHAIN TRANSMISSION

(75) Inventors: Shunji Sakura, Osaka (JP); Masatoshi Sonoda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 429 days.

(21) Appl. No.: 12/690,411

(22) Filed: Jan. 20, 2010

(65) Prior Publication Data

US 2010/0216581 A1 Aug. 26, 2010

(30) Foreign Application Priority Data

Feb. 25, 2009 (JP) .................................. 2009-041842

(51) Int. Cl.
 *F16G 13/04* (2006.01)
 *F16G 1/28* (2006.01)
 *F16G 5/20* (2006.01)
 *F16H 7/06* (2006.01)

(52) U.S. Cl. ........ 474/212; 474/155; 474/156; 474/157; 474/202

(58) Field of Classification Search .................. 474/153, 474/155, 156, 157, 202, 206, 210, 212, 213
See application file for complete search history.

(56) References Cited

U.S. PATENT DOCUMENTS

| | | | | |
|---|---|---|---|---|
| 6,244,983 | B1 * | 6/2001 | Matsuda | 474/155 |
| 6,325,735 | B1 * | 12/2001 | Kanehira et al. | 474/212 |
| 6,432,011 | B1 * | 8/2002 | Kanehira et al. | 474/215 |
| 7,329,198 | B2 * | 2/2008 | Kotani | 474/212 |
| 7,357,742 | B2 * | 4/2008 | Wagner et al. | 474/215 |
| 7,691,020 | B2 * | 4/2010 | Sakura et al. | 474/156 |
| 7,789,783 | B2 * | 9/2010 | Young et al. | 474/213 |
| 2002/0028720 | A1 * | 3/2002 | Horie et al. | 474/213 |
| 2003/0045388 | A1 * | 3/2003 | Kotera | 474/212 |
| 2003/0125146 | A1 * | 7/2003 | Saitoh | 474/212 |
| 2005/0277507 | A1 * | 12/2005 | Ogo et al. | 474/206 |
| 2009/0156342 | A1 | 6/2009 | Matsuda | |

FOREIGN PATENT DOCUMENTS

JP 2007-162836 6/2007

* cited by examiner

*Primary Examiner* — Sang Kim
*Assistant Examiner* — Minh Truong
(74) *Attorney, Agent, or Firm* — Howson & Howson LLP (57) ABSTRACT

In a silent chain transmission, the distance between the centers of front and rear pin holes of each of the inner link plates of the chain is smaller than the length of the smallest chord obtained by dividing, by the number of sprocket teeth, the circumference of a circle having a radius extending from the center of the sprocket to the center of a pin hole of a link plate of the chain when the last-mentioned link plate is fully engaged with the sprocket.

8 Claims, 6 Drawing Sheets

SILENT CHAIN TRANSMISSION

CROSS-REFERENCE TO RELATED APPLICATION

This application claims priority on the basis of Japanese Patent Application No. 2009-041842, filed on Feb. 25, 2009. The disclosure of Japanese Patent Application No. 2009-041842 is incorporated by reference into this application.

FIELD OF THE INVENTION

The invention relates to a silent chain transmission in which toothed link plates are connected in interleaved rows by connecting pins to form an endless chain which can be in mesh with spaced sprockets so that, by engagement of the link plate teeth with sprocket teeth, rotation of one sprocket causes movement of the chain, and movement of the chain is transmitted to another sprocket.

BACKGROUND OF THE INVENTION

In a well-known form of silent chain, each toothed link plate has a pair of teeth and a pair of pin holes. The link plates are disposed in alternating guide rows and link rows. The connecting pins are fixed to pin holes in guide plates disposed at both ends of each guide row on the outermost sides of chain. The pins fit loosely in pin holes in the toothed link plates so that the chain can flex and bend around sprockets.

In accordance with another aspect of the invention, the link plate teeth are shaped so that the inside surface of the rear tooth of each inner link plate comes into contact with a sprocket tooth on engagement with the sprocket, and the inside surface of the front tooth of each inner link plate is contact with a sprocket tooth on disengagement.

Figure 5:
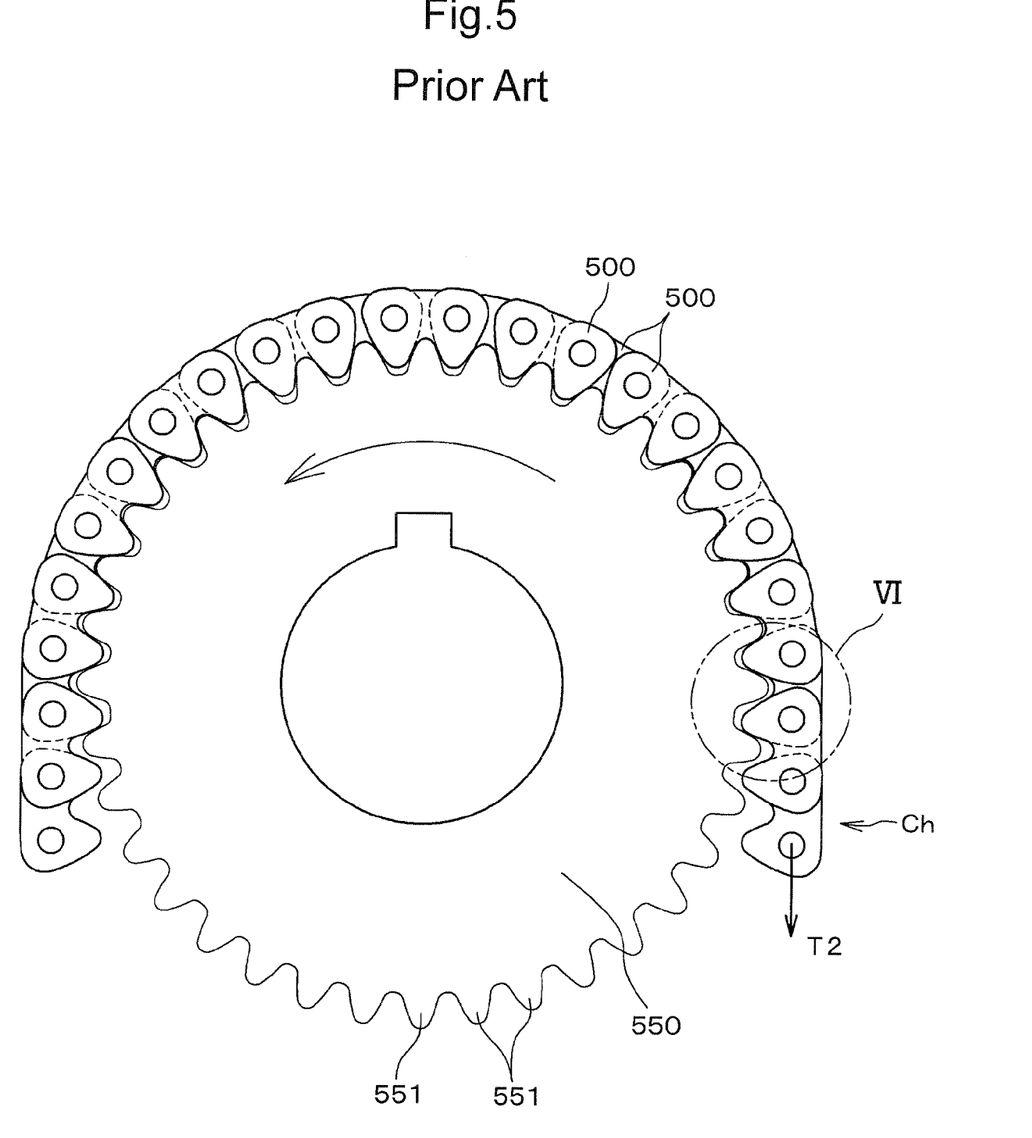
FIG. 5 is a side elevational view of a portion of a conventional silent chain transmission.

As shown in FIG. 5, in a conventional chain transmission, as a link plate 500 engages with a sprocket tooth 551, surfaces of the tooth heads of the chain first contact the tooth heads of the sprocket and slide along the tooth surfaces of the sprocket. By reason of its sliding action, a silent chain has a smaller impact compared to that of a roller chain or a bushing chain, and suppresses noise. Initial engagement can take place between a sprocket tooth and an inside tooth surface of a link plate, or between a sprocket tooth and an outside surface of a link plate. Improvements in tooth forms have been proposed to reduce impact, and examples of such improvements are described in United Stated patent publication 2009/0156342, published Jun. 18, 2009.

Figure 6A:
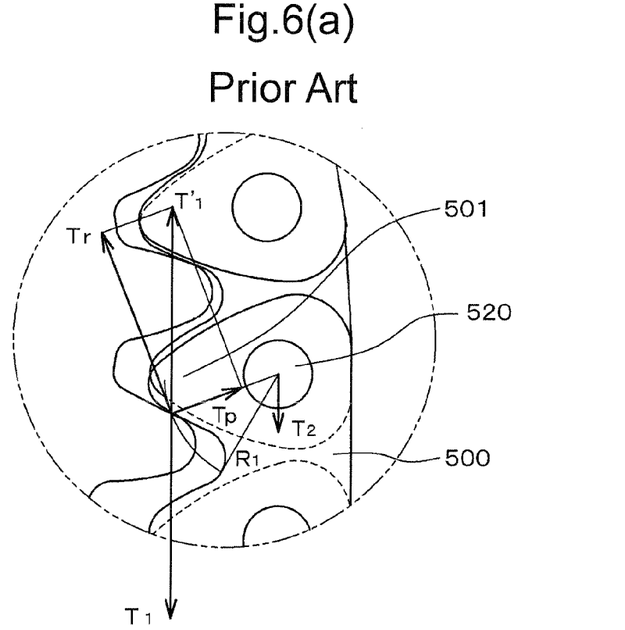
FIG. 6(a) is a detailed side elevational view of a portion of a conventional chain transmission at a location at which the chain comes into engagement with a sprocket and in which the initial contact takes place between an inside face of a chain tooth and a front face of a sprocket tooth.
Figure 6B:
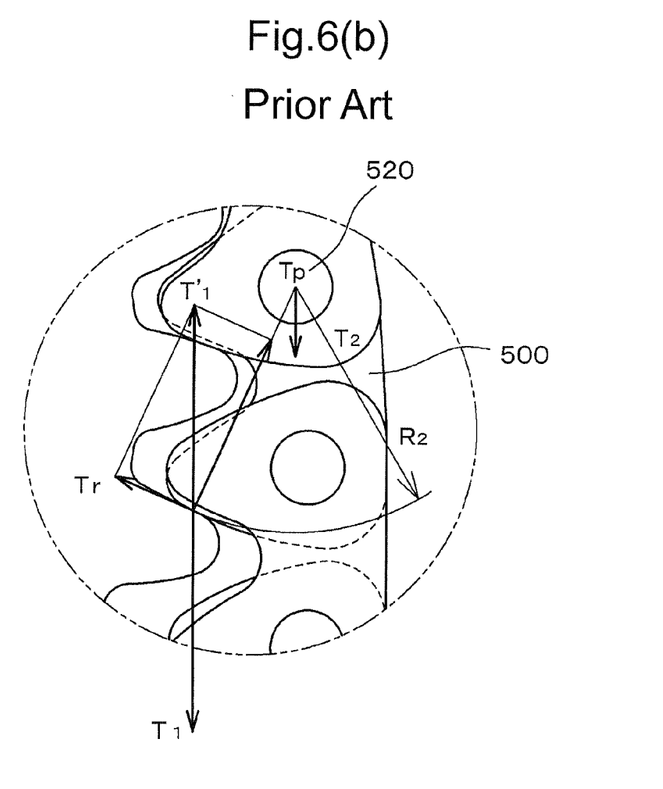
FIG. 6(b) is a detailed side elevational view of a portion of a conventional chain transmission at a location at which the chain comes into engagement with a sprocket and in which the initial contact takes place between an outside face of a chain tooth and a front face of a sprocket tooth.

FIGS. 6(a) and 6(b) are enlarged views of an area VI in FIG. 5 at the location of engagement of a link plate 500 of a conventional silent chain with a sprocket 550, the views pertaining respectively to a chain transmission in which initial engagement is between an inside link plate surface and a sprocket tooth, and an alternative chain transmission in which initial engagement is between an outside link plate surface and a sprocket tooth.

As shown in FIG. 6(a), when an inside surface of a tooth 501 of the link plate 500 engages with, or disengages from, a sprocket tooth, tension $T_2$ in the silent chain, and force $T_1$ at the point of contact between a sprocket tooth and a link plate tooth change rapidly, inevitably generating impact noise.

Moreover, as shown in FIG. 6(a), when an inside surface of a plate tooth first engages a sprocket tooth or disengages therefrom, a drag $T'_1$ corresponds to the force $T_1$. A large component Tr of the drag $T'_1$ generates a moment $Tr \cdot R_1$, which rotates the link plate 500 toward the sprocket about the axis of the connecting pin 520. Furthermore, as shown in FIG. 6(b), when the outside surface of a plate tooth first engages the sprocket tooth or disengages therefrom, a component Tr of drag $T'_1$ corresponding to the force $T_1$ applied at the point of contact also rotates the link plate toward the sprocket about connecting pin 520. This force Tr, as shown in FIG. 6(b), is smaller than the force Tr in FIG. 6(a). However, the radius $R_2$ between the connecting pin and the contact point is larger than the radius $R_1$ in FIG. 6(a). Therefore the moment $Tr \cdot R_2$ is comparable in magnitude to moment $Tr \cdot R_1$ in FIG. 6(a). Thus, the force components Tr become factors that contribute to vibration in the free span of the chain that travels between sprockets. At the same time, the force component Tp at the contact point and extending toward the connecting pin 520 increases. As a result, there was a problem of impact noise due to rapid changes in the chain tension $T_2$, and in the force $T_1$ applied at the contact point.

An object of this invention is to provide a silent chain transmission, which prevents rapid changes in the force applied at the point of contact between a sprocket tooth and a plate tooth of the chain on engagement and disengagement, and also prevents rapid changes in chain tension, so that noise generated in the operation of the chain transmission is reduced by reducing impact noise and suppressing vibration.

SUMMARY OF THE INVENTION

The silent chain transmission according to the invention includes a sprocket having a plurality of sprocket teeth and a chain in mesh with the sprocket. The chain comprises widthwise guide link rows and non-guide rows. Each guide link row is composed of a pair of guide plates each having a pair of front and rear pin holes, and a plurality of inner link plates arranged between the guide plates. Each inner link plate has a pair of front and rear plate teeth having opposed inside surfaces facing each other and a pair of front and rear pin holes having centers spaced from each other by a distance. Each non-guide link row is composed of a plurality of inner link plates, each having a pair of front and rear plate teeth having opposed inside surfaces facing each other, and a pair of front and rear pin holes having centers spaced from each other by a distance. The plates of each guide link row are interleaved with the plates of two non-guide rows. Connecting pins extend through the pin holes and connect the rows of link plates in their interleaved relationship so that the link plates of each row are pivotable relative to the link plates of each adjacent row interleaved therewith.

In the foregoing respects, the transmission is similar to a conventional silent chain transmission. The silent chain transmission of the invention, however, differs from the conventional silent chain transmission in that the distance between the centers of the front and rear pin holes of each of its inner link plates is smaller than the length of the chord of an arc obtained by dividing, by the number of teeth on the sprocket, the circumference of a circle having a radius extending from the center of the sprocket to the center of a pin hole of a link plate of the chain when the last-mentioned link plate is fully engaged with the sprocket.

The effect of the shortened distance between centers of the front and rear pin holes is that chain tension opposes the force applied by the chain teeth to the sprocket teeth as the chain teeth engage or disengage from the sprocket. Accordingly, when the contacting surfaces of the chain teeth slide inward relative to the sprocket teeth on engagement and outward relative to the sprocket teeth on disengagement, the contacting surfaces of the sprocket teeth and the plate teeth gradually approach or leave each other, and the chain tension and the force applied to the chain are transferred smoothly, reducing impact noise. Furthermore, the drag at the engagement and disengagement points is small, and consequently, the magnitude of the component that rotates the link plates is reduced, and vibration is suppressed, resulting in a further reduction in noise.

In accordance with another aspect of the invention, the link plate teeth are shaped so that the inside surface of the rear tooth of each inner link plate comes into contact with a sprocket tooth on engagement with the sprocket, and the inside surface of the front tooth of each inner link plate is in contact with a sprocket tooth on disengagement. Accordingly, vibration of the free spans of the chain caused by rotational moments imparted to the link plates by forces from the sprocket teeth on engagement and disengagement is suppressed and noises can be reduced.

According to still another aspect of the invention, opposed inside surfaces of the front and rear teeth of each inner link plate have a shape such that both inside surfaces remain in contact with a sprocket tooth while the inner link plate is fully engaged with the sprocket. Accordingly, only the inside surfaces of the front and rear plate teeth slide while coming into contact with surfaces of the sprocket teeth. Therefore, contact pressure between the plate teeth and the sprocket tooth changes continuously and smoothly as the chain is wound around the sprockets, and impact noise is reduced.

In an alternative embodiment, the link plate teeth are shaped so that the outside surface of the front tooth of each inner link plate comes into contact with a sprocket tooth on engagement with the sprocket, and the outside surface of the rear tooth of each inner link plate is in contact with a sprocket tooth on disengagement. As in the previously described embodiment in which the inside surface of a rear tooth comes into contact with a sprocket tooth on engagement and the inside surface of a front tooth is in contact with a sprocket tooth on disengagement, vibration of the free spans of the chain caused by rotational moments imparted to the link plates by forces from the sprocket teeth on engagement and disengagement is suppressed and noises can be reduced.

According to still another aspect of the invention, the distance between the centers of the front and rear pin holes of the inner link plates of the guide link rows is different from the distance between the centers of the front and rear pin holes of the inner link plates of the non-guide rows. As a result, the timing of engagement and disengagement between the inner link plates and the sprocket becomes non-uniform, suppressing vibration due to resonance, and further reducing noise.

DETAILED DESCRIPTION OF THE PREFERRED EMBODIMENTS

The silent chain transmission according to the invention is similar to a conventional silent chain transmission except that the distance between the centers of the front and rear pin holes of each of the inner link plates of the chain is smaller than the length of the chord of an arc obtained by dividing, by the number of teeth on the sprocket, the circumference of a circle having a radius extending from the center of the sprocket to the center of a pin hole of a link plate of the chain when the last-mentioned link plate is fully engaged with the sprocket. Accordingly, the transfer of force between the sprocket teeth and the link plate teeth at the time of engagement and disengagement becomes smooth, impact noise is reduced, and vibration is suppressed. These advantages of the invention can be realized in various embodiments, as will be apparent from the following detailed description.

Figure 1:
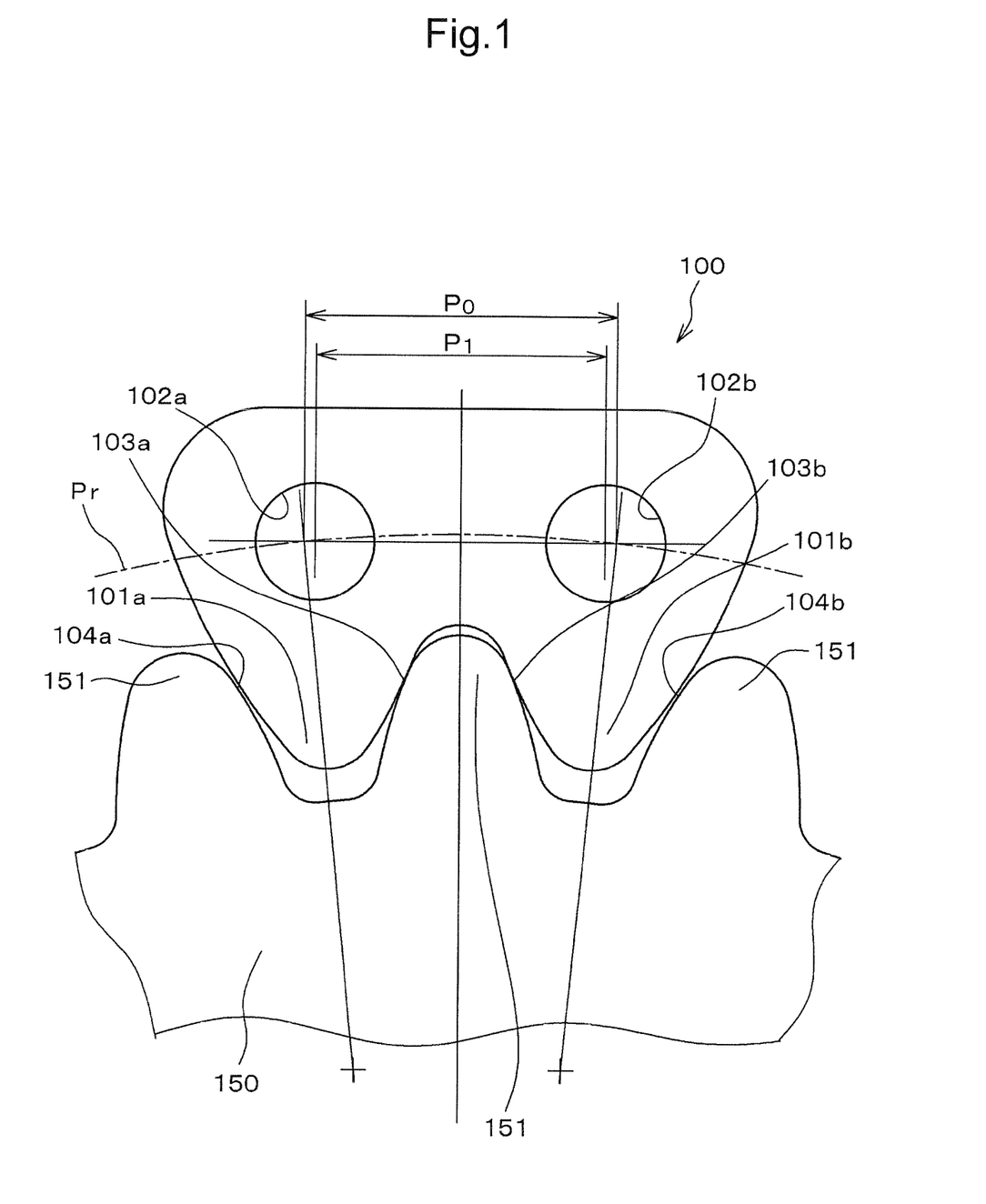
FIG. 1 is a side elevational view showing an inner link plate of a silent chain in full engagement with a portion of a sprocket in a chain transmission according to a first embodiment of the invention at a location at which the chain is in full engagement with the sprocket.

As shown in FIG. 1, an inner link plate 100 of a silent chain has front and rear plate teeth 101a and 101b, and front and rear pin holes 102a and 102b. Movement of the chain is converted to rotation of a sprocket 150 by engagement of the teeth of the link plate 100 with a sprocket tooth 151.

The distance $P_1$ between the centers of the front and rear pin holes 102a and 102b is smaller the standard pitch $P_0$. The standard pitch $P_0$ is the length of a chord of an arc defined by determining the circumference of a pitch circle Pr, having a radius extending from the center of the sprocket 150 to the center of a pin hole 102a or 102b when the link plate 100 is fully engaged with the sprocket 150, and dividing the circumference by the number of sprocket teeth.

Inside surfaces 103a and 103b of teeth 101a and 101b come into contact with the sprocket teeth 151. Alternatively outside surfaces 104a and 104b of the link plate teeth may come into contact with sprocket teeth 151.

Figure 2:
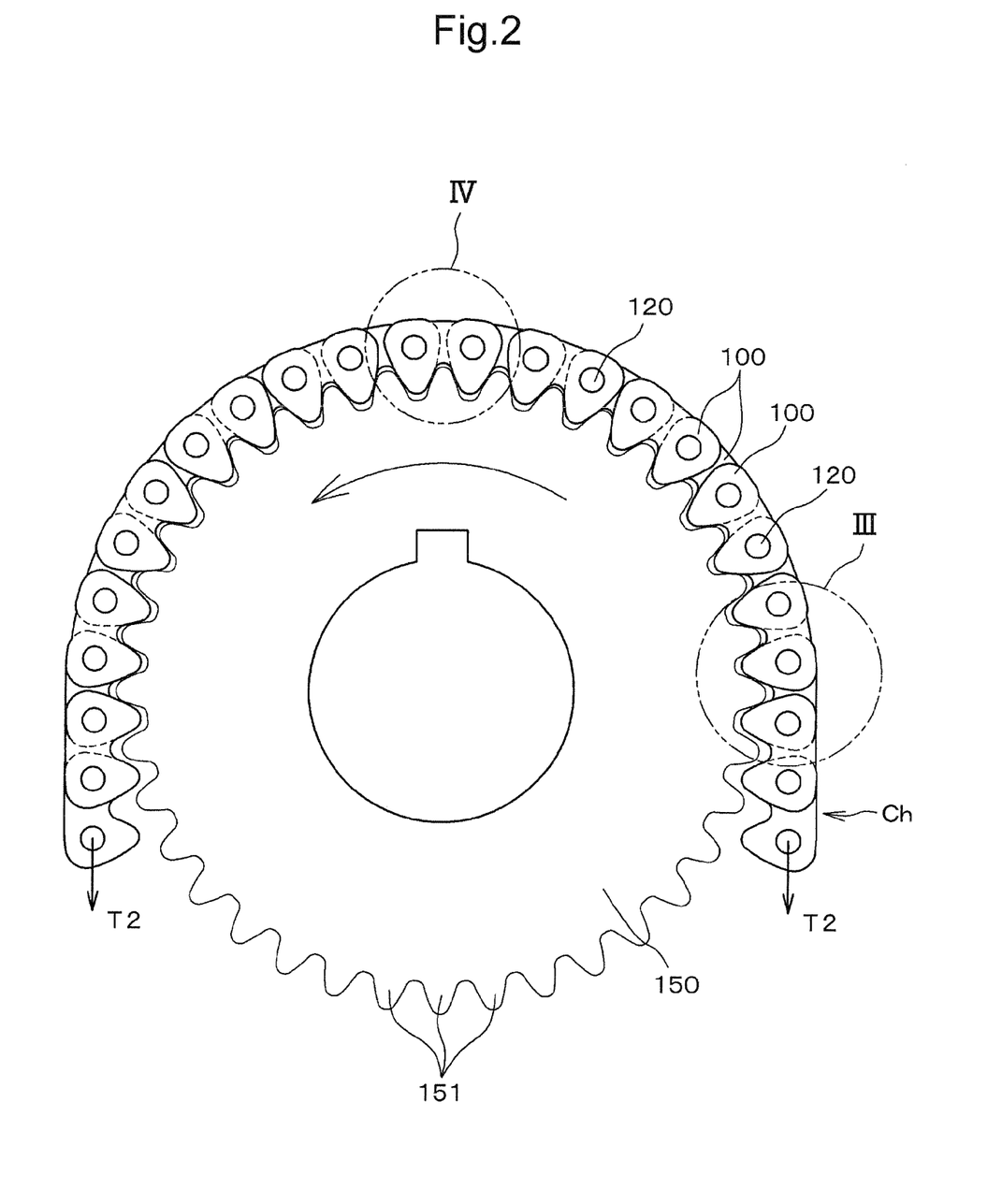
FIG. 2 is a side elevational view of a portion of a chain transmission according to the invention.

As shown in FIG. 2, a silent chain Ch is composed of alternating guide link rows and non-guide link rows, each comprising a plurality of inner link plates 100. The link plates are interleaved, and the rows are interconnected by connecting pins 120. Teeth 101 of the inner link plates 100 engage sprocket teeth 151 so that driving force is transmitted from the chain Ch to the sprocket 150, or from the sprocket 150 to the chain Ch.

As shown in FIG. 1, the distance $P_1$ between the centers of pin holes 102a and 102b of link plate 100 smaller than the standard pitch $P_0$. Thus, when the silent chain Ch moves counterclockwise as shown in FIG. 2, the surfaces of the plate teeth that are first brought into contact with the sprocket teeth are front tooth surfaces with reference to the direction of advancing movement of the chain. Accordingly, the tension $T_2$ in the free span of the chain is not applied to the sprocket tooth at the location of engagement. Rear surfaces of the teeth of the chain come into contact with the sprocket teeth only as the chain is wrapped around the sprocket.

When the silent chain Ch disengages from the sprocket 150, the front sides of the plate teeth of the chain become separated from the sprocket teeth, and only the rear sides of the chain teeth are in contact with the sprocket teeth at the point of disengagement. Therefore, as in the case of engagement of the chain with the sprocket, on disengagement, the chain tension $T_2$ in the free span of the chain is not applied to the sprocket tooth at the location of disengagement.

The case where opposed inside surfaces 103a and 103b of the front and rear teeth 101 of the inner link plate 100 come into contact with a sprocket tooth 151 at the time of first engagement and last disengagement will be described in more detail with reference to FIG. 3(a).

Figure 3A:
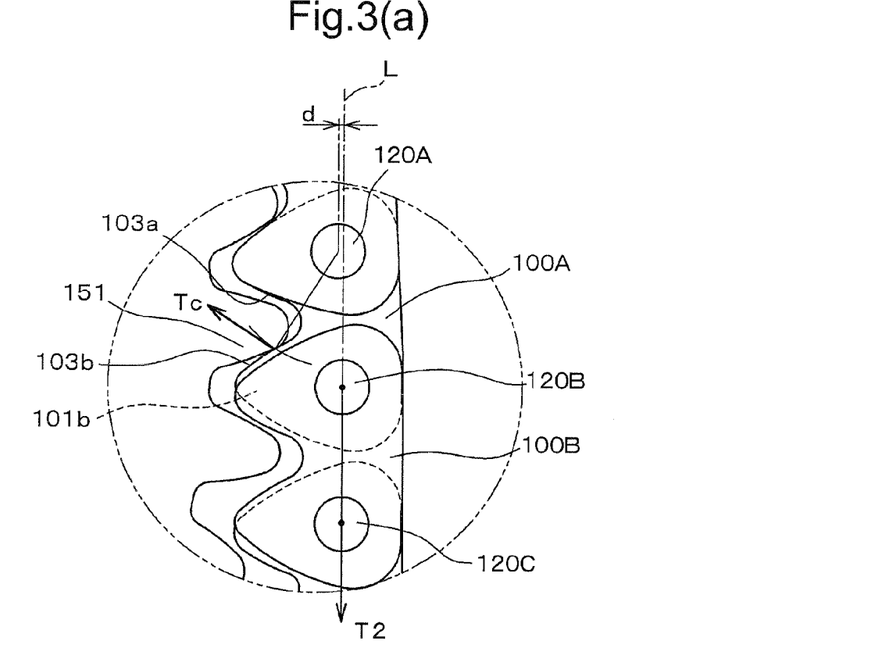
FIG. 3(a) is a detailed side elevational view of a portion of the chain transmission of the first embodiment, at a location at which the chain comes into engagement with the sprocket.

As shown in FIG. 3(a), tension $T_2$, applied to an inner link plate 100 from a free span of the chain, acts along a line L connecting the centers of a connecting pin 120B and a connecting pin 120C. Pin 120B is adjacent a tooth that is about to contact a sprocket tooth, whereas pin 120C is adjacent a tooth in the free span of the chain and farther from the sprocket. Since the center of connecting pin 120A is shifted from line L toward the sprocket by a distance d, tension $T_2$ generates a moment that tends to rotate the link plate 100A toward the sprocket about connecting pin 120A.

Force Tc, which is applied to a contact surface of a sprocket tooth 151 by an inside surface 103b of tooth 101b of link plate 100A, is the only force generated by the moment $T_2 \cdot d$, and, since the distance d is small, the force Tc is also small. Therefore, rapid changes in the force applied to the contact surfaces of the sprocket teeth and link plate teeth on engagement and disengagement, are suppressed, as are rapid changes in chain tension. As a result, impact noise is reduced. Furthermore, since the force Tc, which is applied at the contacting surfaces of the sprocket and link plate 100A, does not impart a force to link plate 100B in the free span of the chain, vibration is suppressed, and noise is reduced.

As illustrated in FIG. 1, the shape of the link plates in this embodiment is such that opposed inside surfaces 103a and 103b engage the sprocket teeth on full engagement, while the outside surfaces 104a and 104b are spaced from the sprocket teeth 151. Accordingly, impact noise generated by engagement of the outside surfaces with the sprocket teeth can be prevented.

An embodiment in which outside surfaces 104a and 104b of the front and rear plate teeth of the inner link plates come into contact with the sprocket teeth 151 on engagement and disengagement will be described with reference to FIGS. 3(b) and 4.

Figure 3B:
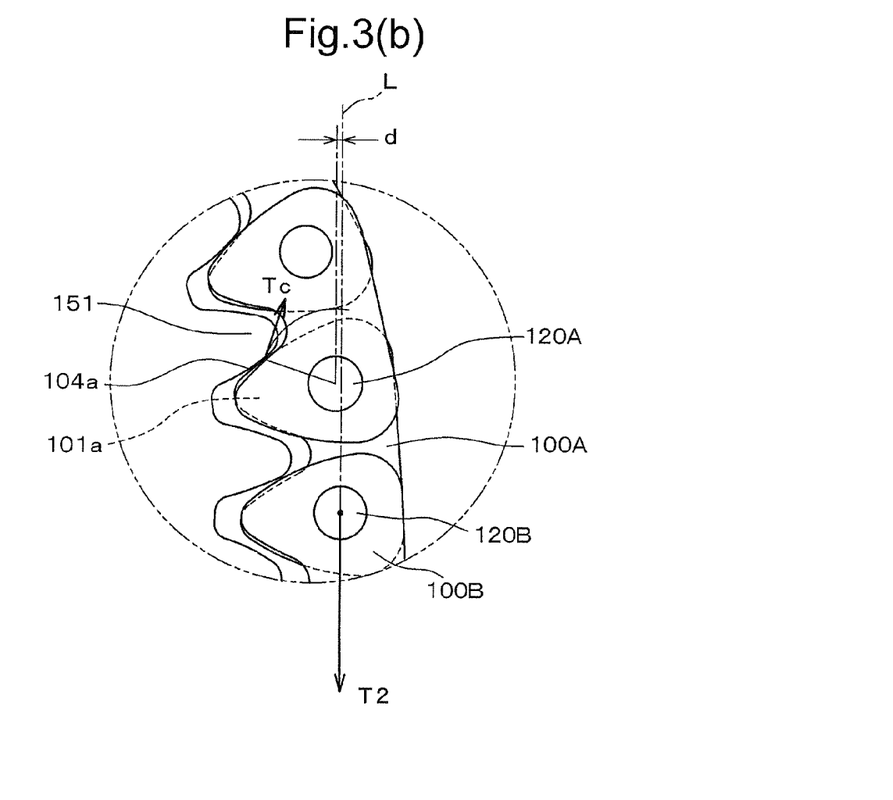
FIG. 3(b) is a detailed side elevational view of a portion of the chain transmission according to a second embodiment of the invention, at a location at which the chain comes into engagement with the sprocket.

As shown in FIG. 3(b), since tension $T_2$ in the free span of the chain acts along line L, and the center of the connecting pin 120A of the inner link plate 100A is shifted by a distance d toward the sprocket from line L, tension $T_2$ generates a moment which tends to rotate the plate 100A toward the sprocket. Force Tc, which is applied by an outside surface 104a of the plate tooth 101a to the sprocket tooth 151, is the only force generated by this moment. Since the distance d is small, the force Tc is also small. Therefore, rapid changes in the force applied to the contact surfaces at the locations of engagement and disengagement are avoided, and rapid changes in tension in the chain are also suppressed. Consequently impact noise is reduced. Furthermore, since the force Tc, which is applied at the contacting surfaces of the sprocket and link plate 100A, does not impart a force to link plate 100B in the free span of the chain, vibration is suppressed, and noise is reduced.

Figure 4:
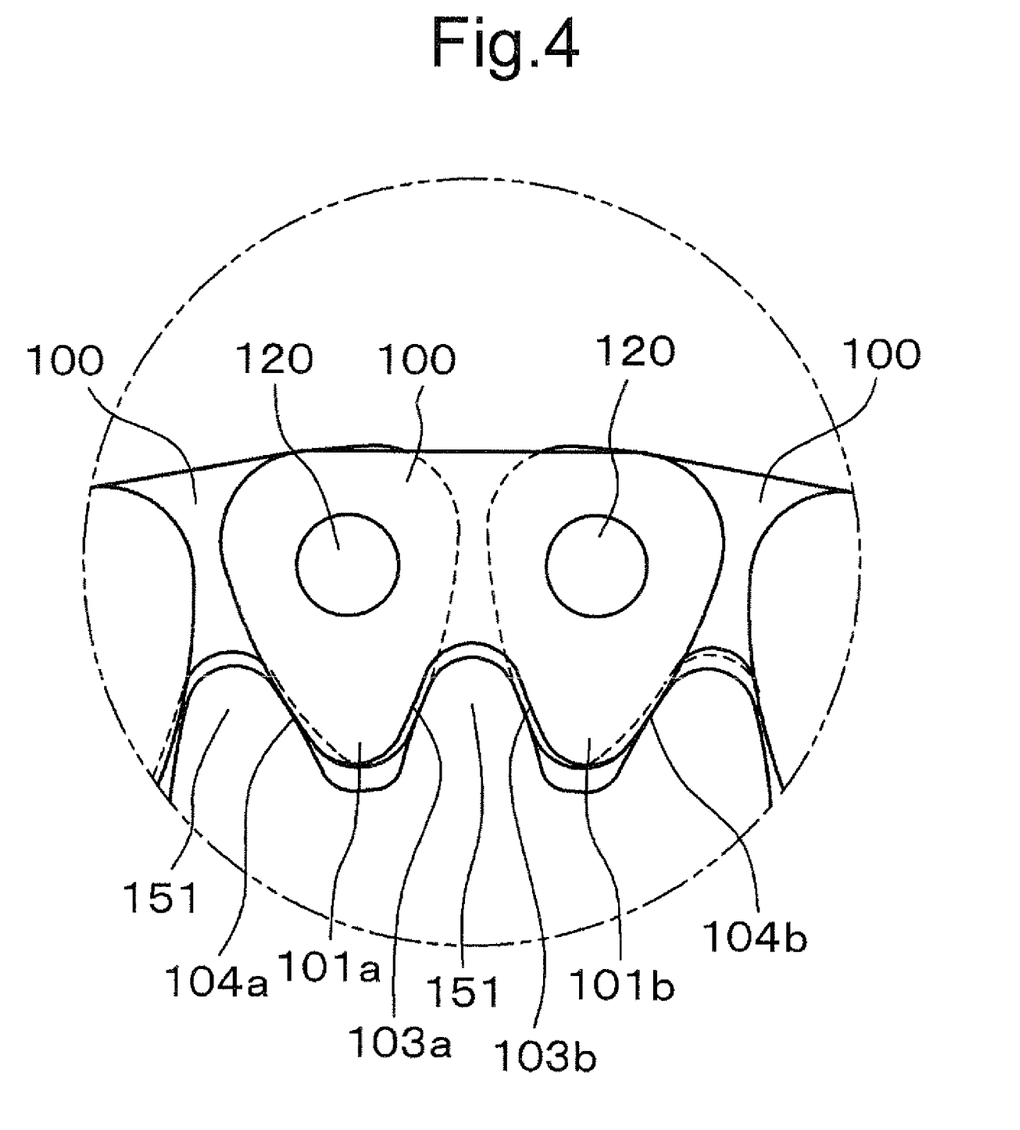
FIG. 4 is a detailed side elevational view of a portion of the chain transmission according to the second embodiment of the invention, at a location at which the chain is in full engagement with the sprocket.

As illustrated in FIG. 4, the shape of the link plates in this second embodiment is such that the outside surfaces 104a and 104b engage the sprocket teeth on full engagement, while the inside surfaces 103a and 103b are spaced from the sprocket teeth 151. Accordingly, impact noise generated by engagement of the inside surfaces with the sprocket teeth can be prevented.

According to the invention, rapid changes in force applied at the contacting surface of a sprocket tooth and a plate tooth on engagement and disengagement are prevented and rapid changes in chain tension are also prevented, so that impact noise is reduced and vibration is suppressed. Even as elongation of the chain occurs, vibration and noises will not increase until a link plate surface, which comes into contact with a sprocket tooth at the engagement and disengagement points is a surface that faces in the direction of the tension force in the free span of the chain.

When the distances between the pin holes in the guide rows is different from the distance between the pin holes in the non-guide rows of the silent chain according to the invention, the timing of engagement and disengagement becomes less regular, and vibration due to resonance can be suppressed.

What is claimed is:

1. A silent chain transmission comprising a sprocket having a plurality of sprocket teeth and a chain in mesh with the sprocket, the chain comprising widthwise guide link rows and non-guide rows, wherein:
    each guide link row is composed of a pair of guide plates each having a pair of front and rear pin holes, and a plurality of inner link plates each having a pair of front and rear plate teeth having opposed inside surfaces facing each other, said inner link plates being arranged between said guide plates and each of said inner link plates having a pair of front and rear pin holes having centers spaced from each other by a distance;
    each non-guide link row is composed of a plurality of inner link plates, each having a pair of front and rear plate teeth having opposed inside surfaces facing each other and a pair of front and rear pin holes having centers spaced from each other by a distance;
    the plates of each guide link row are interleaved with the plates of two non-guide rows;
    connecting pins extend through the pin holes and connect the rows of link plates in their interleaved relationship whereby the link plates of each row are pivotable relative to the link plates of each adjacent row interleaved therewith; and
    the distance between the centers of the front and rear pin holes of each of said inner link plates is smaller than the length of the chord of an arc obtained by dividing, by the number of sprocket teeth, the circumference of a circle having a radius extending from the center of the sprocket to the center of a pin hole of a link plate of the chain when the last-mentioned link plate is fully engaged with the sprocket.

2. A silent chain according to claim 1, wherein the link plate teeth are shaped so that the inside surface of the rear tooth of each inner link plate comes into contact with a sprocket tooth on engagement with the sprocket, and the inside surface of the front tooth of each inner link plate is in contact with a sprocket tooth on disengagement.

3. A silent chain according to claim 2, wherein opposed inside surfaces of the front and rear teeth of each said inner link plate have a shape such that both said inside surfaces remain in contact with a sprocket tooth while said inner link plate is fully engaged with the sprocket.

4. A silent chain according to claim 3, wherein the distance between the centers of the front and rear pin holes of said inner link plates of the guide link rows is different from the distance between the centers of the front and rear pin holes of said inner link plates of the non-guide rows.

5. A silent chain according to claim 2, wherein the distance between the centers of the front and rear pin holes of said inner link plates of the guide link rows is different from the distance between the centers of the front and rear pin holes of said inner link plates of the non-guide rows.

6. A silent chain according to claim 1, wherein the link plate teeth are shaped so that the outside surface of the front tooth of each inner link plate comes into contact with a sprocket tooth on engagement with the sprocket, and the outside surface of the rear tooth of each inner link plate is in contact with a sprocket tooth on disengagement.

7. A silent chain according to claim 6, wherein the distance between the centers of the front and rear pin holes of said inner link plates of the guide link rows is different from the distance between the centers of the front and rear pin holes of said inner link plates of the non-guide rows.

8. A silent chain according to claim 1, wherein the distance between the centers of the front and rear pin holes of said inner link plates of the guide link rows is different from the distance between the centers of the front and rear pin holes of said inner link plates of the non-guide rows.

* * * * *